Jan. 3, 1967 W. A. SCHAICH 3,295,286
CEMENTITIOUS SLAB WITH BOLT MEANS
Original Filed May 31, 1961 3 Sheets-Sheet 1

INVENTOR.
WILBUR A. SCHAICH
BY
Thomas A. Meehan
& W. A. Schaich

INVENTOR.
WILBUR A. SCHAICH

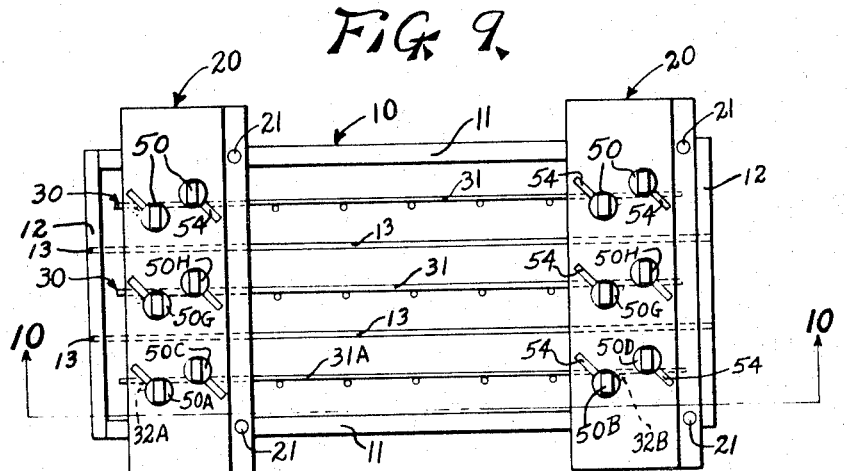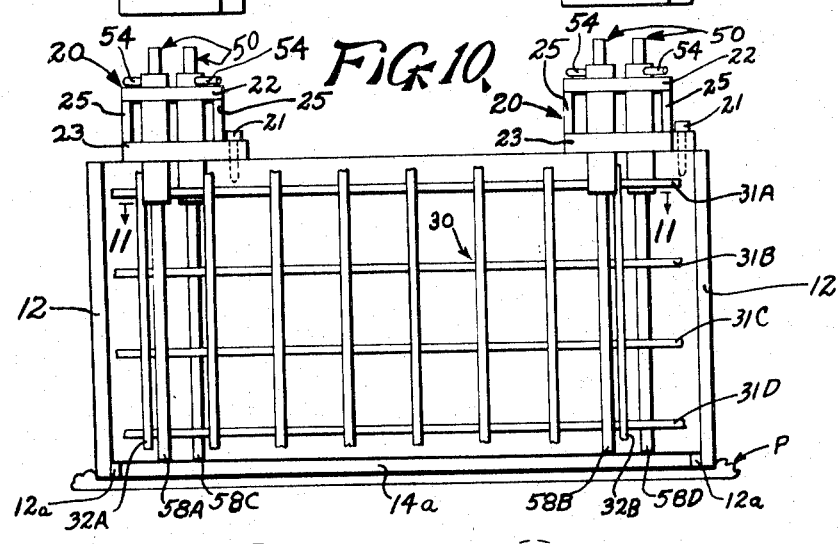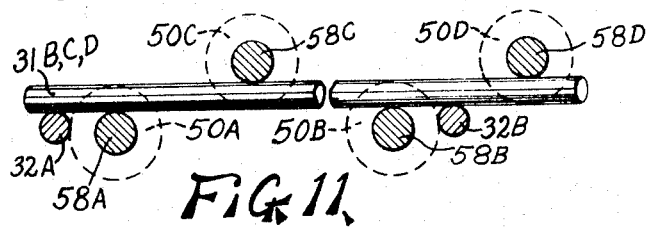

United States Patent Office 3,295,286
Patented Jan. 3, 1967

3,295,286
CEMENTITIOUS SLAB WITH BOLT MEANS
Wilbur A. Schaich, Maumee, Ohio, assignor to Owens-Illinois, Inc., a corporation of Ohio
Original application May 31, 1961, Ser. No. 113,942, now Patent No. 3,201,846. Divided and this application Dec. 30, 1964, Ser. No. 422,212
1 Claim. (Cl. 52—584)

This application is a division of my co-pending application Serial No. 113,942 and assigned to the assignee of this application, now U.S. Patent 3,201,846.

This invention relates to a novel slab and an improved method of manufacturing such slabs to provide therein the apertures necessary for assembling the slabs according to the method of the invention.

There has been an increasing interest in the construction industry in the utilization of lightweight slabs or panels of cementitious materials to form the side walls of residential and commercial structures. One popular form of such panels constitutes a material popularly known as foam concrete which is manufactured by the introduction of a foaming or foamable material into a cementitious slurry so that a large number of macroscopic cells are produced in which each individual air cell is surrounded by the cementitious slurry. When this material is permitted to harden and set, either by air drying or by an accelerated drying in an autoclave, the resulting product will have densities on the order of 40 pounds per cubic foot or less, so that slabs or panels of such material ranging in height up to ten or twelve feet and in width from two to four feet can be efficiently and economically produced by continuous production operations in a factory and then shipped to the building erection site and there assembled into an integral wall structure.

In the assembling of such wall structures, the cementitious slabs or panels are most conveniently erected in side-by-side relationship with the major dimension of the panel constituting the height dimension of the finished wall. Obviously, some form of rigid connection must be provided between adjacent panels to withstand lateral stresses imposed on the building wall by the wind. Additionally, a weather-tight joint must be provided between the edges of the adjacent panels. In accordance with the method of this invention, each panel is rigidly secured to the adjacent panels on each side by an internally disposed bolt-like element. The restraining forces exerted by such bolt-like elements may also be utilized to produce a compression of sealing material inserted between the contiguous edges of the panels, if desired. The resulting wall structure will thus be integrally united so far as resistance to lateral forces are concerned, will have all joints sealed against the entry of water or moisture vapor and all of the bolt-like fastening elements will be concealed from view.

To practice the panel assembly method of this invention, it is essential that each of the cementitious slabs be provided with at least two specially shaped openings or holes which respectively traverse the width dimension of the slab or panel, with at least one of such holes being located near the lower portion of the slab or panel and at least one other such hole being located adjacent the top portion of the slab or panel. While it is possible to produce such holes by a drilling operation on the panels after their manufacture, and to insert separate countersunk mechanisms for keeping boltheads from turning, a further feature of this invention is the provision of an improved method for incorporating such dual purpose holes or openings in the slabs or panels during the manufacture of the cementitious slab or panel.

Accordingly, it is an object of this invention to provide an improved method for assembling a plurality of cementitious slabs or panels in upright, side-by-side relationship to form a building wall.

A further object of this invention is to provide an improved cementitious slab or panel having specially shaped and arranged openings to facilitate the assembly of such panels in upright, side-by-side relationship.

Still another object of this invention is to provide an improved method for fabricating cementitious slabs or panels with specially shaped openings extending transversely of the panels and parallel to the width dimension thereof.

The specific nature of this invention, as well as other objects and advantages thereof, will become apparent to those skilled in the art from the following detailed description, taken in conjunction with the annexed sheets of drawings, on which:

FIG. 9 is a top elevational view of a mold structure embodying this invention which may be used for simultaneous casting of a plurality of cementitious slabs or panels utilized in the wall of FIG. 2;

FIG. 10 is a sectional view taken along the plane 10—10 of FIG. 9;

FIG. 11 is a partial sectional view taken on the line 11—11 of FIG. 10.

Figures 1, 2:
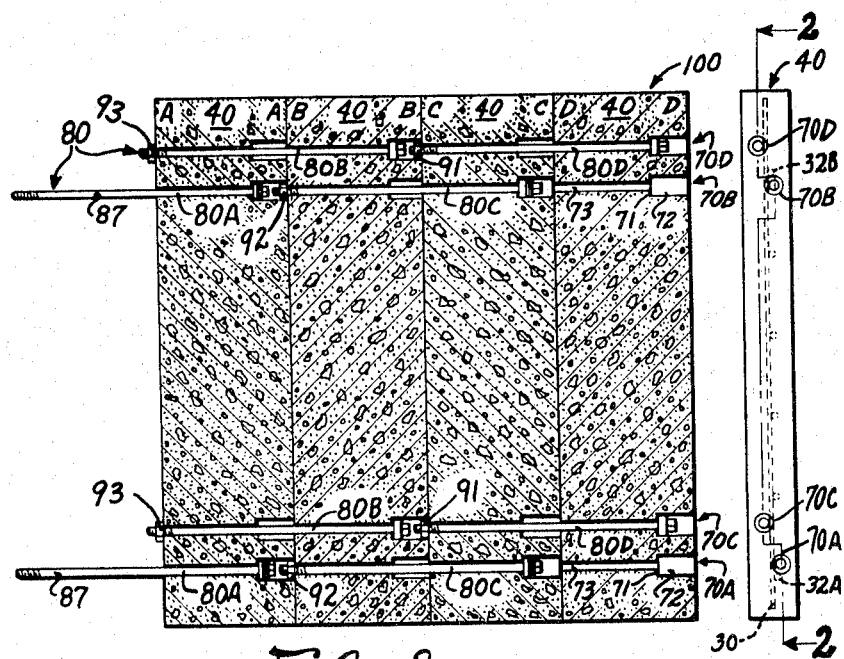
FIG. 1 is a side elevational view of one of the cementitious panels utilized in the wall of FIG. 2.
FIG. 2 is a vertical sectional view, taken on the line 2—2 of FIG. 1, showing a plurality of cementitious panels disposed in side-by-side relationship.
Figure 3:
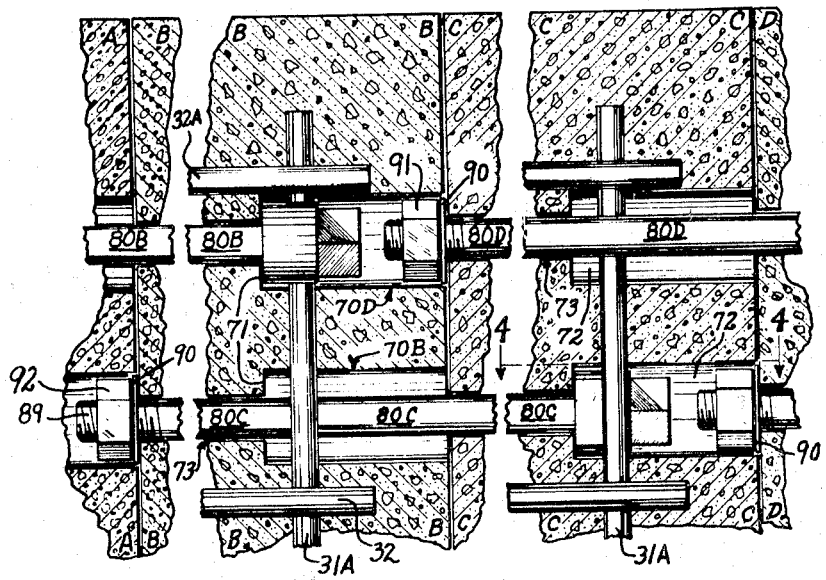
FIG. 3 is an enlarged scale, partially sectional view of a portion of the wall of FIG. 2.

Referring now in more detail to the drawings, wherein similar reference numerals identify corresponding parts throughout the several views, in FIG. 2 the assembly of wall 100 is shown with a two retaining bolt system at the top and a two retaining bolt system at the bottom; however, it is evident that this wall may also be assembled with a minimum of one retaining bolt in the top system and a minimum of one retaining bolt in the bottom system. In assembling wall 100, FIG. 2, panel 40C is bolted against panel 40D by two bolts 80D, placed in the upper holes 70D and 70C of each pair of holes. Before panel 40C is placed in edge-to-edge relationship with panel 40D, a pair of bolts 80C, are inserted, threaded shank in the same direction, in the lower holes 70B and 70A of the panel 40C, FIGS. 1 and 2. Washers 90, FIG. 3, are then slipped over the ends of bolts 80D and nuts 91, are then drawn up on bolts 80D on the left hand edge of 40C until panel 40C is brought in line with and securely against panel 40D.

Two bolts, 80B, FIG. 2, are then inserted into and through holes 70D and 70C in panel 40B, which is then placed in line with the two protruding bolts 80C. The shank ends of bolts 80C are inserted in their corresponding holes 70B and 70A of panel 40B so that it may be moved against panel 40C. When panel 40B is in close relationship with panel 40C the nuts 91 on bolts 80D are covered by the same recesses 72, FIGS. 2 and 3, that also hold the heads of bolts 80B.

The nuts 92 are then drawn upon bolts 80C to make panel 40B part of the wall 100. The heads of two bolts 80A are then seated in the countersunk end of each lower hole 70B and 70A and panel 40A is ready to push over protruding shank ends of bolts 80B. When panel 40A is pushed up to panel 40B the nuts 93 are drawn up on bolts 80B which completes four panel wall 100 as shown in FIG. 2. The two bolts 80A shown protruding from panel 40A, FIG. 2, are left thus, to demonstrate the appearance of a wall when a fifth panel is to be placed in juxtaposition to the left of panel 40A.

For making a plurality of panels from cementitious slurry, a cubical rectangular mold 10, FIGS. 9 and 10, is used, having two easily removable side walls 11, and two similar removable end walls 12, all four resting on base 14, composed of spaced hollow tubes 14a which become individual panel bases, whereby the resulting cementitious casting may be easily sliced into separate panels 40, FIGS. 1 and 2. These hollow beams are held in fixed relationship by a system of removable, equally spaced end plugs 12a carried by end walls 12. This base structure rests upon an elastomeric pad P, FIG. 10, which prevents loss of slurry through the spaces 13 of FIG. 9 lying between the hollow beams.

Such mold structure is described and illustrated in the copending application of Richard C. Gasmire, Serial No. 841,339, filed September 21, 1959, assigned to the assignee of this application now abandoned.

To support a reinforcing mesh 30, FIGS. 9 and 10, in proper position to be incorporated in each of the sliced panels there is provided a plurality of vertically disposed rod-like mesh retainers 50 which are described in more detail in my said co-pending application Serial No. 113,942. In the specific embodiment of the invention illustrated in the drawings, FIGS. 9–11, four of such mesh-retainers 50 are provided for each individual mesh 30, two of such mesh-retainers being disposed on one side of the particular mesh 30 and adjacent to the respective ends thereof, and the other two mesh-retainers 50 being disposed on the opposite side of the particular mesh 30 and closely adjacent to the other mesh-retainers. In principle, each mesh-retainer comprises a rod-like element which may be inserted by an axial movement into the mold 10 in a fixed position closely adjacent to the particular mesh 30 and then rotated to effect a locking engagement between the mesh-retainer 50 and one or more of the horizontally disposed mesh wires 31 of the particular mesh 30.

A supporting structure 20, FIGS. 9 and 10, for the mesh-retainers 50 is provided comprising a lower plate member 23, an upper plate member 22 and welded side frame elements 25. A support structure 20 is provided at each end of the mold 10 and is accurately located with respect to the mold cavity by dowel pins 21 which pass through the lower plate 23 and into suitable holes provided in the mold side walls 11. Plates 22 and 23 are respectively provided with a plurality of aligned vertical apertures 26 and 27, FIG. 12, there being a set of such apertures for each mesh-retainer 50.

After all of the mesh-retainers 50 have been locked in assembly with the respective reinforcing meshes 30, the mold 10 is then filled with appropriate concrete slurry which is permitted to harden to a self-supporting consistency.

When this condition is reached, the elements of each retainer 50 are withdrawn from the prehardened concrete with a minimum of effort.

The use of such mesh-retainers 50 permits positioning of the reinforcing mesh 30 within the cavity of mold 10 with a very high degree of accuracy and positively locks each such mesh against accidental displacement that might be caused by the force of the concrete being rapidly poured into such mold. At the same time, the panel fastening apertures 70A . . . 70D are accurately defined in each of the panels.

The resulting cake of partially hardened concrete is exposed by removing the mold side walls 11 and end walls 12, whereupon the cake is sliced lengthwise by well known apparatus to form a plurality of panels 40 each containing an accurately positioned reinforcing mesh 30 and traversed by four assembly holes 70A . . . 70D.

Curing and complete hardening of the panels is then effected, either by air drying or autoclaving and the finished panels are then stripped from the mold base tubes 14a.

From the foregoing it will be apparent that the countersunk portions 72 of holes 70 of the finished panels 40, FIGS. 1–4 are respectively made by those parts of the cylindrical mesh retainers 50 which lie below the slurry fill of the mold 10.

Figures 6, 7:
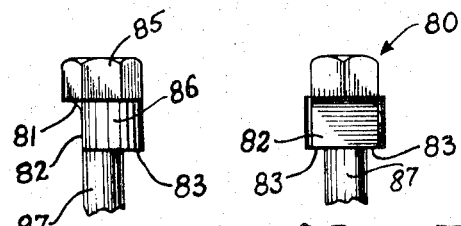
FIG. 6 is a side elevational view of the head of the bolt-like member utilized to assemble the wall of FIG. 2.
FIG. 7 is a front elevational view of the bolthead of FIG. 6.
Figures 4, 5:
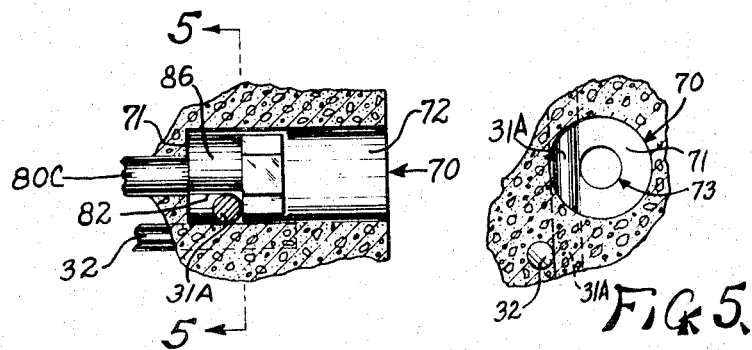
FIG. 4 is a partial sectional view taken on the line 4—4 of FIG. 3.
FIG. 5 is a sectional view taken on the line 5—5 of FIG. 4, but with the bolt element removed.

Shoulder 71, FIG. 5, is formed in the concrete by means of a portion of mesh retainer 50 and the smaller diameter portion 73 of hole 70, FIGS. 1 and 5, which receives the body 87 of bolt 80, FIGS. 6 and 7 is formed by another portion thereof. In FIG. 11, enlarged portions of the retainers shown as phantoms 50A and 50B may be made to rest against vertical wires 32A and 32B of mesh to hold said mesh even more rigidly in place.

The remaining feature of the complex shoulder system in the hole 70, FIG. 5, is an offset shoulder formed by transverse wire 31A, which was held in this relationship to the rest of the countersunk area by the interlocking action of pairs of grooves of mesh-retainer 50.

Figure 8:
FIG. 8 is a top elevational view of the bolthead of FIG. 6.

Since in this type of wall design the heads of any assembly bolts are made inaccessible by the already closed joint between each two previously mounted panels, it is desirable that an internal control means, at the bolt-head area, be provided to prevent the assembly bolts from turning on their central axes in the holes when the nuts are being drawn tight on the opposite threaded ends, two panel widths beyond. This is accomplished by providing the assembly bolts 80, FIGS. 6–8, with a regular hexagonal head 85, topping an unusual shoulder 86, whose bottom face 83 rests upon concrete shoulder area 71, FIGS. 3–5, of countersunk hold in the foamed panel 40. The curved portion 81 of said bolt partly encircles wire 31A of transverse off-set wire shoulder, FIGS. 3–5, while simultaneously, flat sideface 82 sets flush against the exposed straight line side of said transverse wire shoulder, thus preventing the bolt from turning while the nut on threaded end 89 of bolt 80 is being tightened against washer 90 protecting panel 40.

The countersunk chamber 72 of hole 70, FIGS. 3 and 4, is deep enough so that there is space above the head of the traversing bolt for receiving the threaded shank and the nut and washer of the bolt that holds the previous two panels together. These latter projecting items being thus recessed into the next panel, a flush edge-to-edge panel assembly is provided.

In assembling the panels, since each pair of holes is offset on opposite sides of the transverse wire 31 of reinforcing mesh, the flats 82 of the boltheads 85 are always inserted in the face-to-face relationship shown for the two boltheads depicted in panels 40B and 40C of FIG. 3.

A modification of the above four-hole assembly system would be to use only upper pairs of holes and their alternating bolts while securing the bottom edges of the panels in a channelized or grooved foundation.

Another modification would be the reverse of this latter method in that the channel might be provided adjacent to the ceiling area and the lower pair of holes 70 and their alternating bolts 80 would be used to give rigidity to the wall.

Another method of forming the cementitious panel of my invention is to tack weld a specially-shaped locating rod to the reinforcing mesh, in the manner taught generally in U.S. Patent No. 2,979,801. The above referred to specially-shaped locating rod has a minor diameter portion equal to the diameter of the transversely extending hole, and at one end a major diameter portion equal to the diameter of the countersunk portion or recessed portion of the panel. The specially-shaped locating rod is tack welded to the reinforcing mesh with the shoulder, formed at the juncture of the minor and major diameter portions resting on the wire 31a. On rotation of the specially-shaped locating rod, the tack welds will be broken and the rod can then be withdrawn, leaving a transversely extending hole having a recessed portion terminating at the wire 31a.

It will, of course, be understood that various other details of construction may also be modified through a wide range without departing from the principles of this invention, and it is, therefore, not the purpose to limit the patent granted hereon, otherwise than necessitated by the scope of the appended claim.

I claim:

A reinforced cementitous slab for construction purposes comprising a rectangular mass of cementitious material having reinforcing mesh disposed intermediate and parallel to its major faces, said mesh comprising longitudinal and transverse wires, a bolt-receiving aperture traversing said mass and disposed adjacent to the wires of said mesh, said aperture having an enlarged countersunk portion at one end and receiving a bolt having a bolthead having a flattened peripheral chord portion, and a portion of one of the wires of said mesh traversing a peripheral chord area of said countersunk portion and being in engagement with the peripheral chord portion of the bolthead, thereby permitting the head of an inserted bolt to seat upon said wire portion.

References Cited by the Examiner

UNITED STATES PATENTS

| | | | |
|---|---|---|---|
| 707,201 | 8/1902 | Brinkman | 52—228 |
| 1,214,964 | 2/1917 | Small | 52—600 |
| 2,255,511 | 9/1941 | Muller | 52—285 X |
| 2,341,757 | 2/1944 | Brenneman | 52—562 |

FOREIGN PATENTS

| | | |
|---|---|---|
| 134,523 | 1949 | Australia. |
| 437,873 | 1926 | Germany. |
| 195,570 | 1923 | Great Britain. |

RICHARD W. COOKE, JR., *Primary Examiner.*

JOHN E. MURTAGH, *Examiner.*